United States Patent [19]

Schmidt

[11] 3,812,325

[45] May 21, 1974

[54] MEANS FOR READING AND INTERPRETING COLOR-CODED IDENTIFICATION LABELS

[75] Inventor: Joseph J. Schmidt, Baltimore, Md.

[73] Assignee: The Chesapeake and Ohio Railway Company, Cleveland, Ohio

[22] Filed: Aug. 18, 1970

[21] Appl. No.: 64,764

[52] U.S. Cl. ..................235/61.11 E, 340/146.3 K 340/146.3 B, 340/146.3 P

[51] Int. Cl. ............................................ G06k 7/12

[58] Field of Search ...... 250/226, 233, 199; 356/71; 350/3.5, 163; 331/94.5; 235/61.11 E; 340/146.3

[56] References Cited

UNITED STATES PATENTS

| | | | |
|---|---|---|---|
| 3,571,507 | 3/1971 | Korpel | 178/7.1 |
| 3,463,882 | 8/1969 | Herbold | 178/7.1 |
| 3,225,177 | 12/1965 | Stites et al. | 340/146.3 RR UX |
| 3,510,571 | 5/1970 | Biederman | 250/199 |
| 3,426,325 | 2/1969 | Partin et al. | 340/146.3 F |
| 3,292,102 | 12/1966 | Byrne | 331/94.5 |
| 3,622,758 | 11/1971 | Schanne | 340/146.3 Z |
| 3,674,990 | 7/1942 | Kurauchi | 340/146.3 K |
| 3,624,605 | 1/1971 | Aagard | 340/146.3 P |

*Primary Examiner*—Paul J. Henon
*Assistant Examiner*—Robert F. Gnuse
*Attorney, Agent, or Firm*—Cushman, Darby and Cushman

[57] ABSTRACT

An improved system for automatically reading color-coded identification labels by scanning an incident light beam there across and sensing the color of reflected light wherein two laser sources are provided for producing light beams having approximately optimum wavelength spectra for reflection from colored reflective strips within the label and including means for effectively combining such beams into a single incident beam for use in scanning the identification label. A modification is also disclosed wherein each laser beam is individually modulated with a distinguishing code and the distinguishing codes are then detected in the reflected beam to indicate the presence of reflected wavelength spectra associated with a particular code.

5 Claims, 4 Drawing Figures

Figure 1:
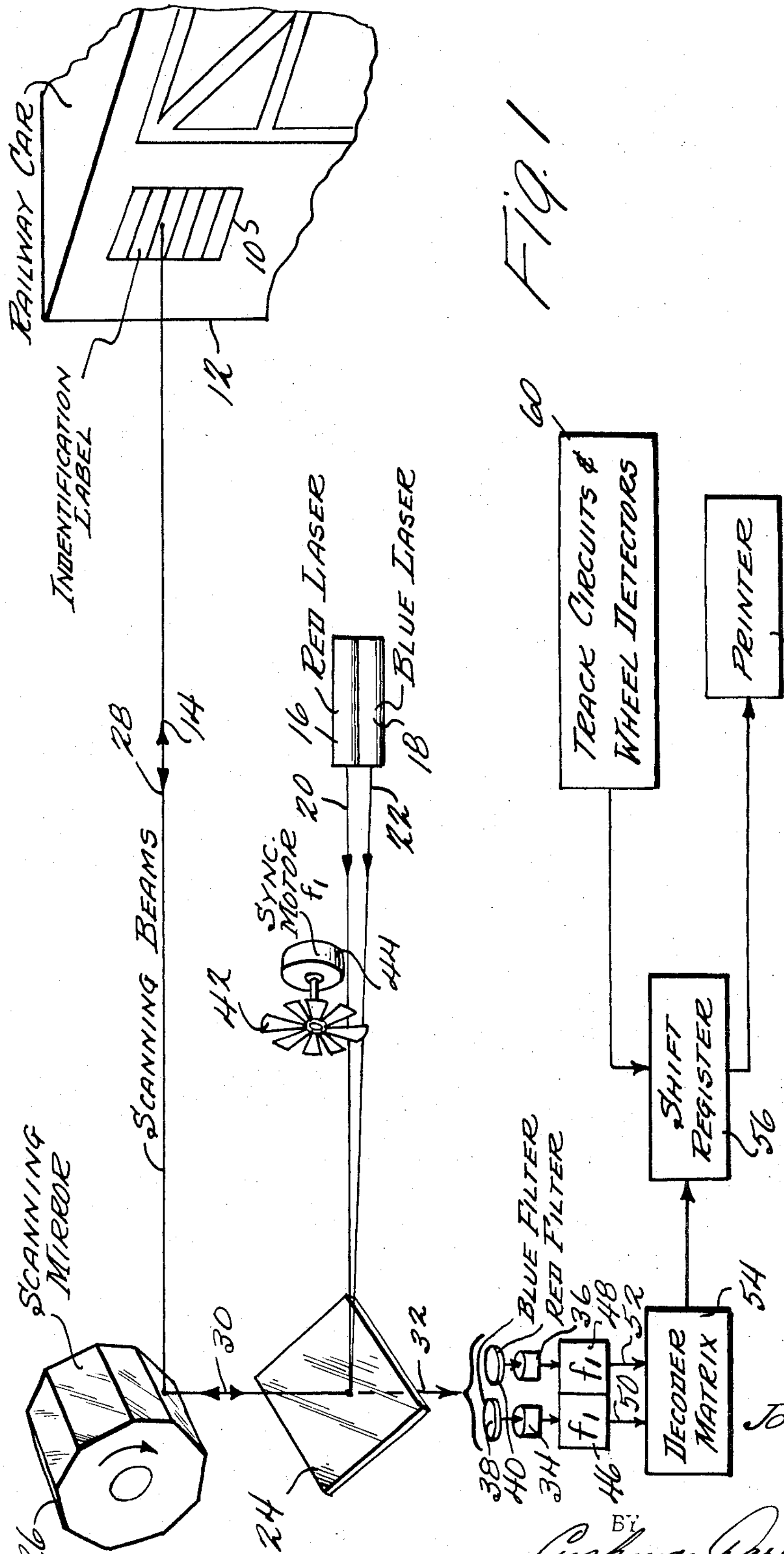

INVENTOR
JOSEPH J. SCHMIDT
BY
Cushman, Darby & Cushman
ATTORNEYS

INVENTOR
JOSEPH J. SCHMIDT

BY Cushman, Darby & Cushman
ATTORNEYS

INVENTOR
JOSEPH J. SCHMIDT
BY
Cushman, Darby & Cushman
ATTORNEYS

MEANS FOR READING AND INTERPRETING COLOR-CODED IDENTIFICATION LABELS

This invention generally relates to an improvement for an optical mark sensing system capable of automatically scanning and reading color-coded information. For instance, such color-coded information is commonly used in identification labels affixed to transportation vehicles such as railroad cars. Such labels comprise a plurality of color-coded retroreflective strips which reflect light of selected wavelengths directly back along the path of an incident beam which includes at least the selected wavelengths of interest.

Systems for automatically scanning and reading such color-coded identification labels are already well known in the art such as, for example, is shown in U.S. Pat. No. 3,225,177 to Stites et al. Although this prior patent describes a basic system for automatically scanning and reading such color-coded labels, there are many practical problems associated with such a system as is evidenced by many of the later issued improvement patents such as U.S. Pat. Nos. 3,299,271; 3,417,231; 3,456,997; 3,145,291; and 3,443,072.

Briefly, these prior known systems for automatically reading such color-coded labels involve the scanning of a wide-wavelength spectra band or "white" light beam across the label and then sequentially sensing the presence of specific colors in retroreflected light by the utilization of dichroic mirrors and/or colored band pass filters in conjunction with separate photo-detectors for each light wavelength of interest. Normally, the labels comprise strips of reflective material having either blue, red, white or black reflecting characteristics. Thus, if the incident white light contains at least both red and blue light, then substantially only red or blue light will be reflected from the red or blue reflecting strips respectively while both red and blue will be reflected from the white strips and neither red nor blue will be reflected from the black strips.

Accordingly, by arranging the sequence of such colored strips in a predetermined pattern according to a predetermined code, the sequence of the colors sensed in the retroreflected beam of light may be decoded by a logic decoding matrix and temporarily stored in a shift register or other means before being displayed on a display indicator or permanently recorded in a printer or other such recording means as is well known by those skilled in the art.

While such a basic system might provide acceptable results under absolutely ideal conditions, in actual field conditions such a basic elementary system fails to consistently give the desired results. For instance, under adverse ambient conditions, there may be large amounts of ambient light present which approximates in intensity the intended source of incident light radiation thus causing spurious responses. Other problems occur when the ambient atmosphere contains large amount of fog or dust or other visually obscuring elements.

It is therefore an object of this invention to overcome these and other deficiencies in the prior known systems for automatically reading color-coded identification labels.

Specifically, it is an object of this invention to provide a system for automatically scanning, reading, and interpreting such color-coded labels as are commonly affixed to rail vehicles (coded according to the automatic car identification system adopted by the Association of American Railroads) in such a manner that false and spurious responses are substantially inhibited while yet permitting accurate and reliable operation even in the most adverse weather or other ambient conditions.

Accordingly, it is an object of this invention to provide an automatic color-coded label reading system comprising at least two separate laser sources producing separate beams (effectively combined prior to reflection) having optimum wavelength spectra for reflection from respective ones of the reflective strips in the identification label. In this manner higher energy level beams of coherent light are utilized to permit the use of narrower band optical filters together with electronic and optical devices which may be operated at a much higher signal level thereby reducing spurious responses due to ambient conditions as well as permitting more efficient and reliable operation when the atmosphere contains obscuring elements.

It is another object of this invention to provide an automatic identification label reading system using two lasers to produce a single incident beam having two distanct wavelength spectra components wherein both of the components are modulated with a common code and wherein the reflected beam from the label is passed through a code discriminator which responds only to reflected light containing the same code as that commonly modulated on the incident beams thereby reducing response due to spurious ambient conditions.

It is yet another object of this invention to provide a system for automatically reading color-coded identification labels wherein two laser sources are utilized for obtaining an incident beam of radiation containing at least two distinct wavelength spectra components and wherein the beam from each of the lasers is modulated with its own distinctive code such that when the reflected beam is detected by a single photo sensitive detector and passed through a code discriminator for distinguishing between each of the codes contained in the reflected beam, the colors or wavelength spectra present in the reflected beam may be sensed thereby even further limiting unwanted spurious responses.

Figure 2:
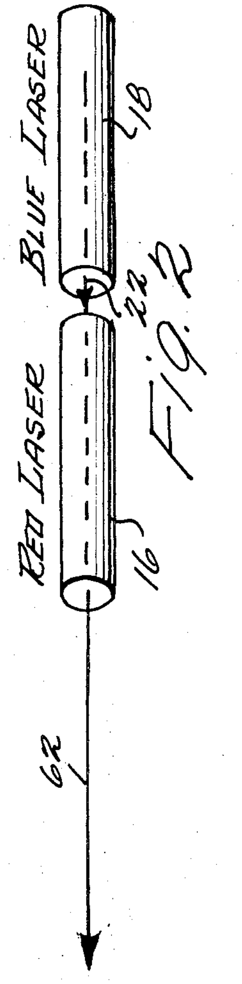
Figure 3:
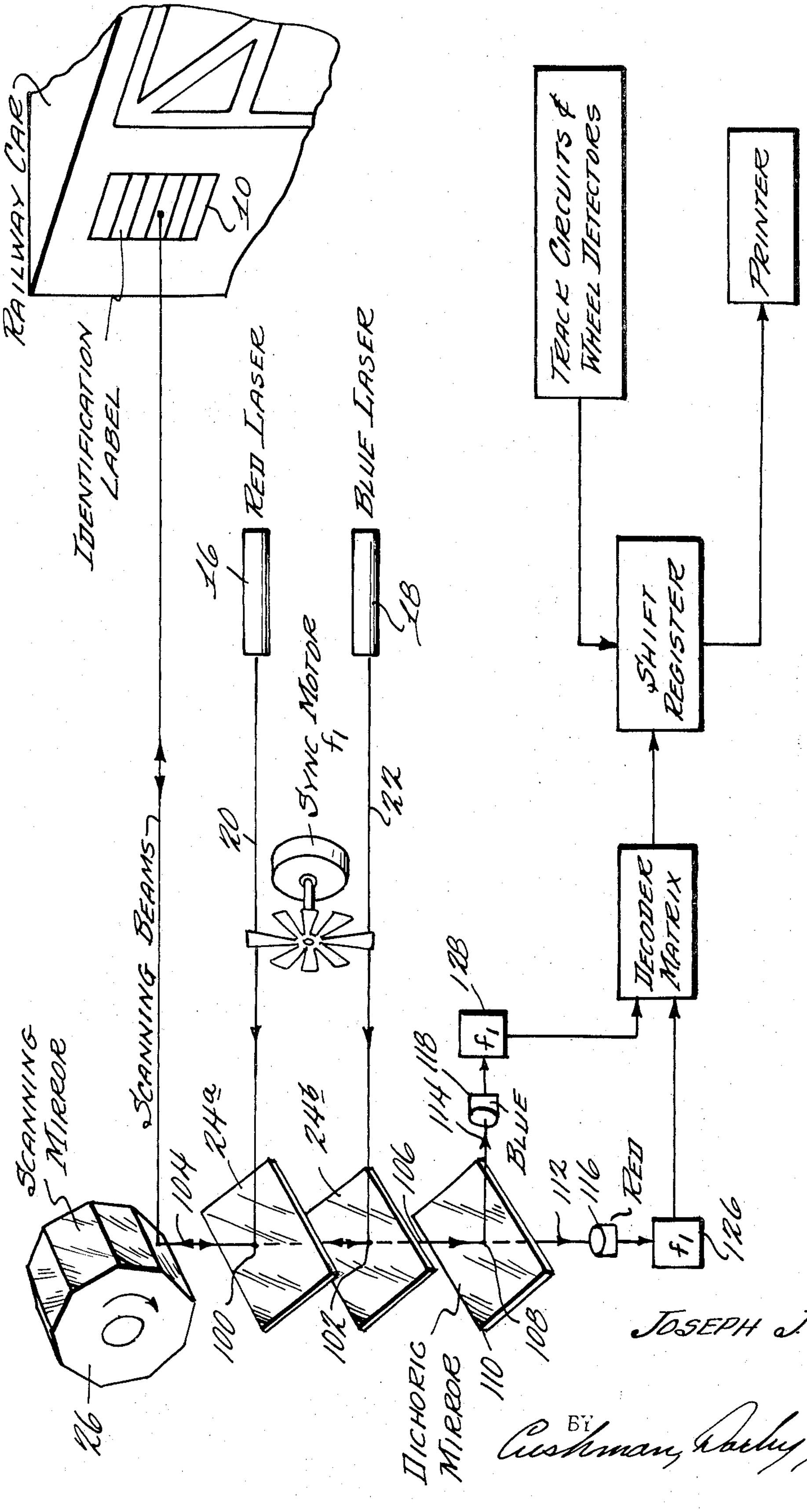
Figure 4:
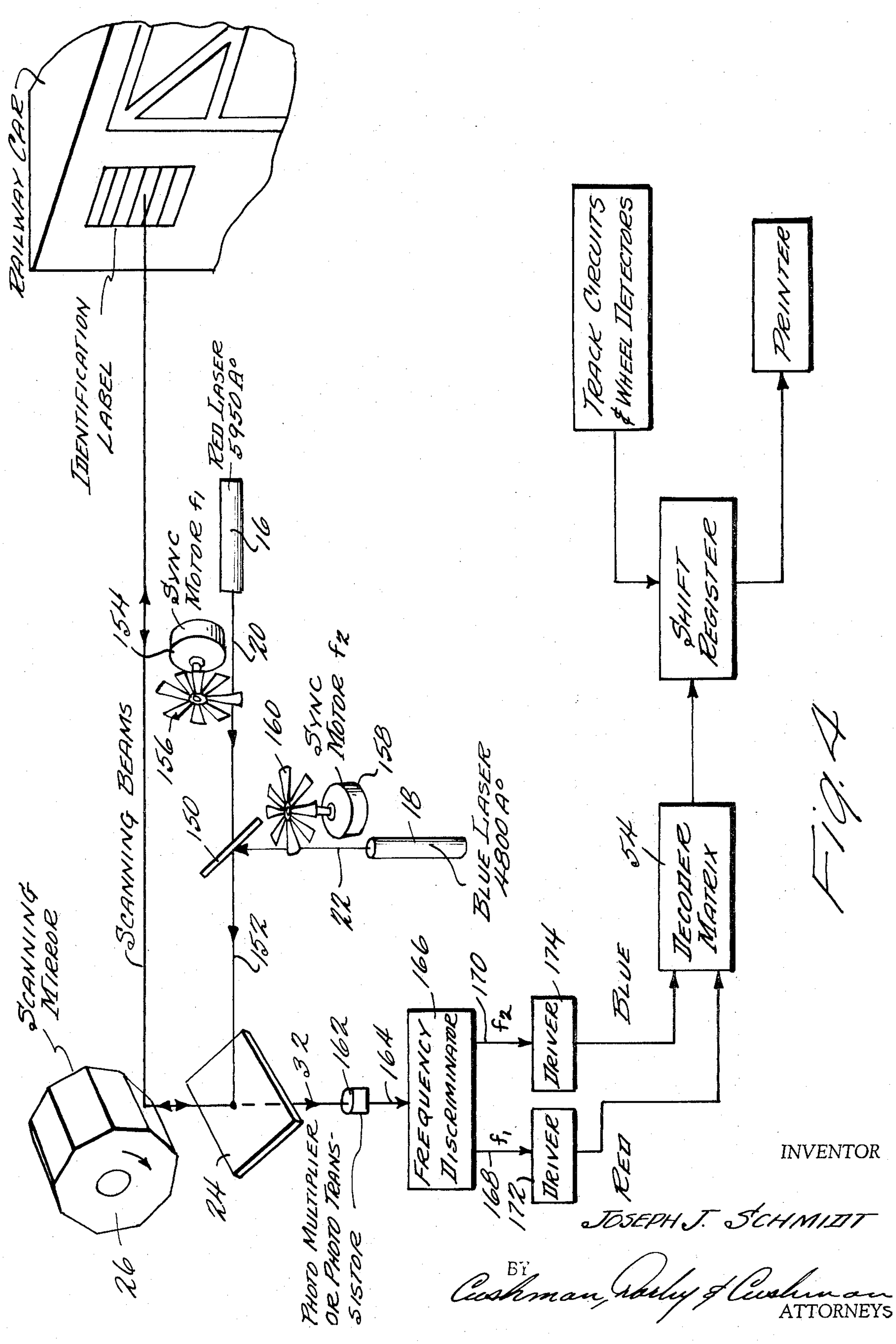

A more complete understanding of this invention may be obtained by carefully studying the following detailed description in conjunction with the drawings of which:

FIG. 1 is a combined block and pictorial diagram of a label reading system in which the improvement of this invention is incorporated, FIG. 2 is a schematic illustration of an alternative mounting arrangement for the lasers shown in FIG. 1, FIG. 3 is a schematic depiction of a modification of the system shown in FIG. 1, and FIG. 4 is a schematic diagram revealing a further modification of the system shown in FIG. 1.

Referring now to FIG. 1, a system is shown for automatically scanning and reading a color-coded identification label 10 which may be mounted on a moving transportation vehicle such as the railway car 12. Color-coded label 10 comprises strips of retroreflective material which according to the usual standard code, selectively reflects red, blue, white, (both red and blue) or black (neither red nor blue). Thus, these four different types of reflecting strips may be combined in particular sequences to provide coded identification characters as well as beginning and ending codes and character separation codes as will be readily appreciated by those skilled in the art.

It is common practice for the red reflective material in the identification label to have a reflection response curve peaking at 5,950 A while the blue reflective material generally has a peak reflection response at approximately 4,800 A. The system shown in FIG. 1 is given an enhanced efficiency by con centrating most of the energy in the incident beam 14 at approximately the wavelengths of the peak reflective responses for the blue and red reflective material used in label 10. A red laser 16 operating at approximately 5,950 A and a blue laser 18 operating at approximately 4,800 A respectively provides a first beam 20 and a second beam 22 of extremely intense coherent radiation having those respective wavelengths. As shown in FIG. 1, the lasers 16 and 18 are mounted side-by-side but at a slight angle of convergence with respect to one another such that the projected beams 20 and 22 are essentially overlapping or coincident along most of the beam path or at least at the point of reflection from label 10.

Converging beams 20 and 22 are then reflected from a partially silvered mirror 24 towards a rotating prism 26 which causes the incident beam 14 to sweep or scan the identification label 10 vertically in a manner well known by those skilled in the art.

The incident beam 14 is then retroreflected as shown at 28 back to the rotating prism 26 and from there along path 30 directly through the partially silvered mirror 24 along path 32 towards photo-detectors 34 and 36 which are respectively preceeded by blue filter 38 and red filter 40 respectively. Thus, if at any given instant a red reflective strip is being scanned on label 10, the beam 20 from laser 16 will be reflected therefrom and detected through red filter 40 by photo detector 36. Similarly, when a blue reflective strip is being scanned, beam 22 will be reflected and detected by detector 34. On the other hand, if a white strip is being scanned, there will be signals concurrently generated by both photo-detectors 34 and 36 while, if a black strip is being scanned, there will be no signal generated by either photo-detector 34 or 36.

To help insure against spurious responses due to ambient light, the beams 20 and 22 are modulated at a predetermined frequency $f_1$ by a rotating light chopper blade 42 which is turned by a synchronous motor 44 to cut the path of beams 20 and 22 at a regular repetition frequency $f_1$. Frequency filters 46 and 48 are then inserted after photo detectors 34 and 36 respectively to pass only signals modulated with the same predetermined frequency $f_1$ imposed upon beams 20 and 22 by light chopper 42.

Thus, the output on lines 50 and 52 from the frequency filters 46 and 48 will provide a faithful and reliable indication of the color reflecting properties of the particular strip being scanned at any particular instant on identification label 10. In essence, the output on lines 50 and 52 provides a two digit binary code which is decoded by decoder matrix 54 in a manner well known to those skilled in the art. The output of the decoder matrix 54 is then input to a shift register 56 for temporary storage. In this manner, a whole sequence of decoded characters from label 10 may be temporarily stored before a whole block of characters corresponding to an entire identification label 10 is printed on printer 58. In addition to the information contained in label 10, the shift register 56 may also be provided with additional information from track circuits and/or wheel detectors shown schematically as element 60 to enable a decision as to when the shift registers should be emptied and printed in printer 58, etc. It will be readily appreciated by those skilled in the art that additional devices such as buffers, drivers and additional logic elements may be readily associated with the basic elements shown in FIG. 1 to provide a complete logic system for automatically recording on printer 58 the contents of identification labels 10 from a series of moving cars 12 as they move past the point of scanning beam 14. Similarly, other means may be used to modulate the laser beams rather than the light chopper, as will be readily appreciated by those skilled in the art. In addition, other means may be utilized for arranging the photo-transistors or detectors 34 and 36 to respond to the red or blue light of 5,950 A and 4,800 A content respectively. Finally, the output of the system in listing form may be in a standard code form such as the well known 5-level Baudot or 8-level ASCII code of the numerals representing the car designation as the vehicles move past the scanner.

Another modification of the arrangement for causing the two laser beams to coincide or to effectively become a single incident beam is shown in FIG. 2. Here, a red laser 16 and blue laser 18 have been mounted in co-axial alignment. Assuming that red laser 16 is constructed with partially silvered mirrors at both ends of its resonant cavity, then the output beam 22 from laser 18 will enter and pass through the resonant cavity of laser 16 and be effectively combined with the output thereof such that at point 62, a single emerging beam will be produced which contains both 5,950 A and 4,800 A wavelength spectra. Of course the position of the red and blue lasers 16 and 18 respectively may be reversed without changing the basic concept of this modification.

Another modification of the FIG. 1 system is shown in FIG. 3. Here a different means is used for combining the output beams of lasers 16 and 18 plus a different means for separating the retroreflected red and blue light into separate photo-detectors. Basically, the system is the same as that for FIG. 1 except that the two lasers 16 and 18 are separated by a greater distance and two partially silvered mirrors 24*a* and 24*b* are utilized rather than the single partially silvered mirror 24 of FIG. 1. As shown in FIG. 3, output beam 20 from red laser 16 is incident upon partially silvered mirror 24*a* at a point 100 from which it is reflected directly upwards towards revolving prism 26. In addition, the output beam 22 from blue laser 18 strikes partially silvered mirror 24*b* at point 102 and is reflected from that point directly upwards to point 100 of partially silvered mirror 24*a*. From here it is transmitted through mirror 24*a* and emerges along the same path as reflected beam 20 from that mirror. Thus, at point 104, there is effectively a single beam containing wavelength spectra of both the red and blue lasers 16 and 18 respectively. It will be readily appreciated by those skilled in the art that the partially silvered mirrors 24*a* and 24*b* are less than ideally efficient in that, in fact, some of the incident beams 20 and 22 will pass therethrough by transmission and be lost and that likewise some of the radiation reflected from point 102 upwards to mirror 24*a* will be reflected by mirror 24*a* and also lost while a portion will still be transmitted to combine with the beam from laser 16 along path 104.

The reflected beam from label 10 passes as in FIG. 1 back from the label to the rotating prism 26 and from thence directly through both of the partially silvered mirrors 24*a* and 24*b* towards means for detecting the presence of either or both of the blue and red light spectra from lasers 16 and 18 in the reflected beam. A modified scheme for such detection is shown in FIG. 3. The reflected beam 106 is incident at point 108 on a dichroic mirror 110 with the red light being directly transmitted through the mirror along path 112 while the blue light is reflected along path 114. In this manner, a photo-detector or photo-transistor 116 responds to the red light while a similar photo-detector 118 responds to the blue light. As before, the output beams 20 and 22 from lasers 16 and 18 are modulated by a light chopper 42 which is turned by a synchronous motor 44 as shown in FIG. 3. Of course, separate choppers with the same or different motors or any other means may be employed to effectively modulate both the beams 20 and 22 at the same pre-determined frequency $f_1$. Likewise the frequency filters 126 and 128 are included after the photodetectors 116 and 118 to respectively pass only signals having the pre-determined frequency $f_1$ modulated thereon. From this point onward, the operation of the decoder matrix and the other portions of the system are exactly as previously described.

Yet another modification of the system of FIG. 1 is shown at FIG. 4. Here, a different means for combining the two laser beams into one beam for scanning the color-coded label is disclosed as well as additional means for detecting the presence of red and/or blue wavelength spectra in the reflected light beam. Here red and blue lasers 16 and 18 are mounted at right angles with respect to one another and at 45° with respect to a partially silvered mirror 150. Beam 20 from red laser 16 is transmitted directly through mirror 150 while blue beam 22 is incident upon mirror 150 at the point of transmission and is thus reflected along with the transmitted beam 20 on a common path 152. From here, the common beam containing frequency spectra of both 5,950 A and 4,800 A is reflected by mirror 24 towards rotating prism 26 in the manner described with respect to FIG. 1.

In the system shown in FIG. 4, a separate synchronous motor and associated light chopper is utilized to modulate each of the beams 20 and 22. Synchronous motor 154 and light chopper 156 modulate beam 20 at a frequency $f_1$ while synchronous motor 158 and light chopper 160 modulate beam 22 at a second frequency $f_2$. Consequently, the color content of reflected beam 32 may now be indirectly detected by detecting the modulation frequency content rather than by actually detecting the colored light itself after separation by using band pass filters or a dichroic mirror as in FIGS. 1 and 3.

Thus, in FIG. 4, there is a single photo-multiplier or photo-transistor 162 which responds to the reflected light beam 32 and provides a signal on line 164 to a frequency discriminator 166. Here, an output is produced on line 168 if frequency $f_1$ (corresponding to a 5,950 A content in light beam 32) is present or an output on line 170 is produced if modulation frequency $f_2$ is present (corresponding to a color content of 4,800 A in reflected beam 32). After passing through respective drivers 172 and 174, the signals corresponding to red and blue content of light beam 32 are again presented to a decoder 54 for processing in the same manner as that previously discussed.

Although only a few embodiments of this invention have been specifically set forth and described in the foregoing specification, it should be obvious to those skilled in the art that there are many possible modifications of this invention which will still provide the desired results as stated above. For instance, substantially any of the disclosed means for effectively combining the two output means from the individual lasers may be used in combination with any convenient means for detecting the color content of the final reflected beam. In addition, different frequency or other code modulation of the spearate laser beams before their combination into a single beam may be utilized in other geometries than that shown specifically in FIG. 4. It should also be apparent that the amplitude modulation of the individual laser beams may be accomplished by other means than by a light chopper and, further that other than amplitude modulation could be imposed upon the beams so long as a proper code discriminator is used in analysing the code content and thus detecting the corresponding color content of reflected light. Accordingly, all such modifications are intended to be included within the scope of this invention.

What is claimed is:

1. In a system for automatically reading color-coded identification labels comprising color-coded reflective strips by scanning incident light waves thereacross and sequentially sensing the wavelengths or colors of reflected light therefrom, the improvement comprising:

a first laser for producing a first output beam having a first wavelength, a second laser for producing a second output beam having a second wavelength, means for effectively combining said first and second output beams to thereby simultaneously include both beams in said incident light waves, said first wavelength being approximately equal to the peak reflective response of one of said color-coded reflective strips, said second wavelength being approximately equal to the peak reflective response of another one of said color-coded reflective strips, a plurality of sensors, each for sensing one color of said reflected light, chopper means for modulating both of said output beams at a predetermined frequency, and filter means operatively connected to the output of each of said sensors for substantially blocking the passage of any signal therethrough unless modulated by said predetermined frequency thereby avoiding spurious responses.

2. In a system for automatically reading color-coded identification labels comprising color-coded reflective strips by scanning incident light waves thereacross and sequentially sensing the wavelengths or colors of reflected light therefrom, the improvement comprising:

a first laser for producing a first output beam having a first wavelength, a second laser for producing a second output beam having a second wavelength, means for effectively combining said first and second output beams to thereby simultaneously include both beams in said incident light waves, said first wavelength being approximately equal to the peak reflective response of one of said color-coded reflective strips, said second wavelength being approximately equal to the peak reflective response of another one of said color-coded reflective strips, first modulating means for modulating said first beam with a first code, second modulating means for modulating said second beam with a second code, photo sensitive means for detecting said reflected light from both said first and second beams, and code discriminating means for sensing the colors present in said reflected light by detecting the presence of said first and second codes modulated thereon.

3. An improvement as in claim 2 wherein:

said first and second modulating means comprise light choppers adapted for rotation by synchronous motors to produce amplitude modulation of said first and second output beams at a first and second frequency respectively, and said code discriminating means comprises a frequency discriminator for detecting said first and second frequencies.

4. A system for automatically reading color-coded identification labels comprising color-coded light reflective strips by scanning incident light waves thereacross and sequentially sensing the wavelengths or colors of reflected light therefrom, said system comprising:

a first laser for producing a first output beam having a first wavelength spectrum approximately corresponding to the wavelength most efficiently reflected from another one of said reflective strips, a second laser for producing a second output beam having a second wavelength spectrum approximately corresponding to the wavelength most efficiently reflected from another one of said reflective strips, combination means for combining at least portions of said first and second output beams into substantially a single incident beam, scanning means for causing said single incident beam to scan across said identification label, detecting means for sensing the presence of said first and second wavelength spectra in said reflected light and for producing corresponding first and second output signals respectively in response thereto, a decoder matrix operatively connected to said detecting means for interpreting said first and second output signals and producing digital output signals representing identification codes contained in said identification label and corresponding to logical combinations of said first and second output signals, a first modulating means for modulating said first output beam with a first code, second modulating means for modulating said second output beam with a second code, and wherein said detecting means includes code discriminating means for sensing the presence of said first and second wavelength spectra by detecting the presence of said first and second codes respectively.

5. A system as in claim 4 wherein:

said first modulation means includes means for amplitude modulating said first output beam at a first frequency, said modulating means includes means for amplitude modulating said second output beam at a second frequency, and said code discriminating means comprises a frequency discriminator for detecting said first and second frequencies.

* * * * *